Jan. 12, 1926.  1,569,820
H. C. LIPSCOMB ET AL
CONVERTIBLE SEAT FOR VEHICLES
Filed Feb. 12, 1924   2 Sheets-Sheet 1
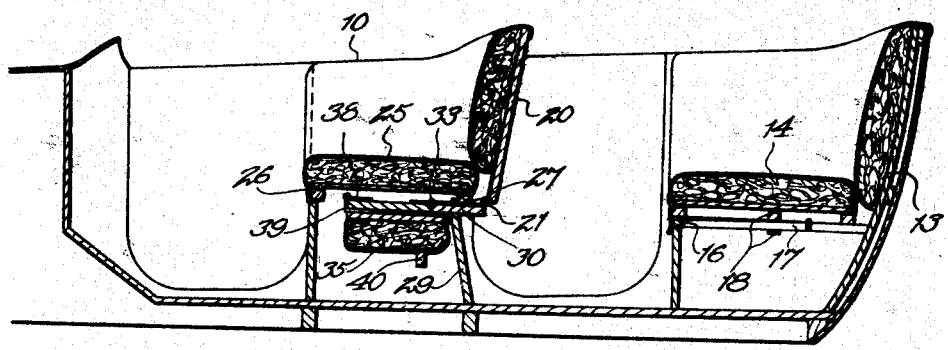
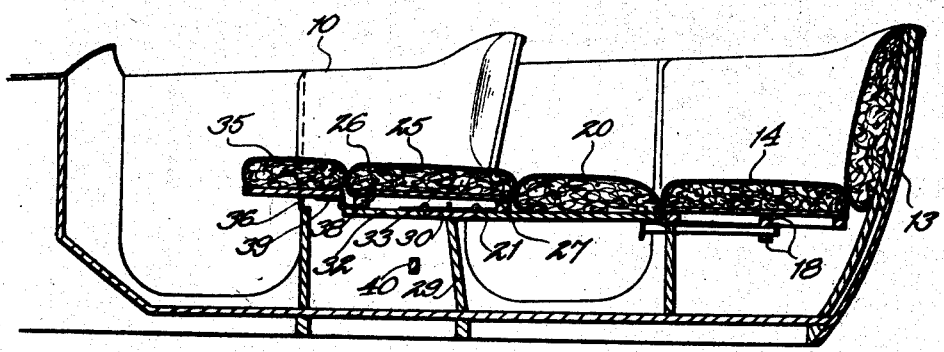
Henry C. Lipscomb
Clayo Powers Lipscomb
INVENTOR
WITNESS:   ATTORNEY Jan. 12, 1926.  1,569,820
H. C. LIPSCOMB ET AL
CONVERTIBLE SEAT FOR VEHICLES
Filed Feb. 12, 1924   2 Sheets-Sheet 2
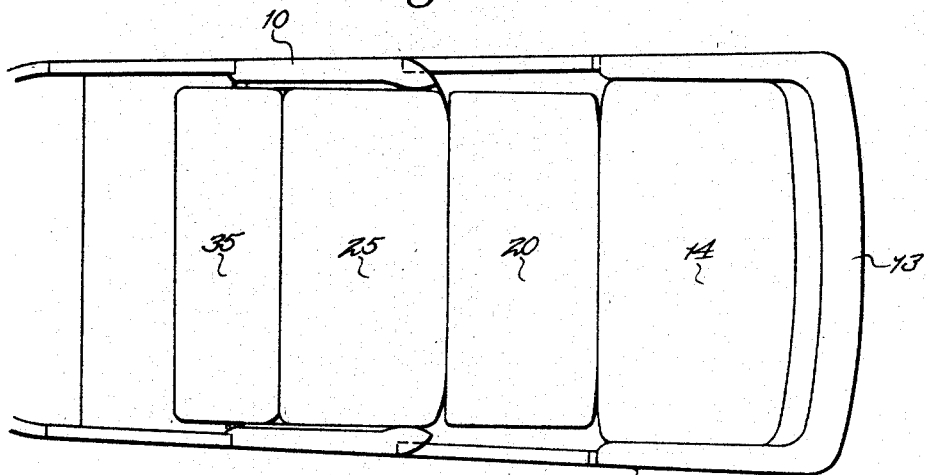
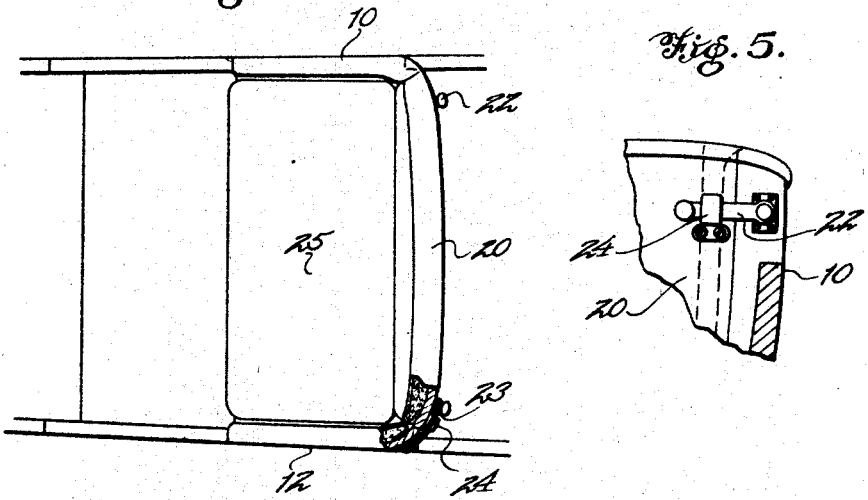
Henry C. Lipscomb
Clay Powers Lipscomb
INVENTOR
BY *Victor J. Evans*
ATTORNEY Patented Jan. 12, 1926.

1,569,820

UNITED STATES PATENT OFFICE.

HENRY CLAY LIPSCOMB AND CLAYO POWERS LIPSCOMB, OF OAKNOLIA, LOUISIANA.

CONVERTIBLE SEAT FOR VEHICLES.

Application filed February 12, 1924. Serial No. 692,325.

*To all whom it may concern:*

Be it known that we, HENRY CLAY LIPSCOMB and CLAYO POWERS LIPSCOMB, citizens of the United States, both residing at Oaknolia, in the parish of East Feliciana and State of Louisiana, have invented new and useful Improvements in Convertible Seats for Vehicles, of which the following is a specification.

The object of this invention is to convert the seats of a motor car or other vehicle, so that the elements of the front seat shall extend in the same plane with the horizontal portion of the rear seat, and permit of use for sleeping purposes.

A further object is to provide particular means for mounting the elements of the front seat, permitting the back to swing downwardly, and to provide an extension element movable from a position under the front seat upwardly to the level of the latter.

With the foregoing and other objects in view, the invention consists in the novel construction and arrangement of elements described illustrated and claimed, it being understood that modifications may be made within the scope of the claim without departing from the spirit of the invention.

In the accompanying drawings,

Figure 1 is a longitudinal section through the body of a motor car and the seats thereof, arranged for ordinary use;

Figure 2 is a similar section after conversion for sleeping purposes;

Figure 3 is a top plan view of the structure of Figure 2;

Figure 4 is a fragmentary plan, with parts broken away to show the locking device at one end of the back of the front seat;

Figure 5 is a fragmentary view in elevation, of the latch, and the parts secured thereby.

The side walls of the body are designated 10 and 12 and the stationary back of the rear seat is shown at 13. Beneath the stationary seat portion 14 we mount bars 16, 17, movable forwardly in guiding and retaining devices 18, and adapted to support the back 20 of the front seat, when the latter is allowed to drop to horizontal position. Element 20 is mounted on hinges 21, and is secured in an upright position by pivoted latches 22, 23, cooperating with retaining devices 24, the latter being on back 20.

The cushion or seat portion 25 of the front seat of the car includes lower bars or strips 26, 27 extending across the body, and this seat 25 is movable from the position of Figure 1 to that of Figure 2, when it rests in part on the rigid element of back 20.

An upwardly extending transverse element 29 supports rigidly an upper strip 30 to which hinges 21 are connected, and a strip 32 is connected by hinges 33 with element 30.

A forward extension 35 includes a cushion and rigid back connected by hinges with strip 32, permitting the extension to be swung from the inoperative position of Figure 1 to horizontal or operative position as shown in Figure 2, at which time the transverse strip or bar 36 aids in supporting said extension. The hinges between elements 35 and 32 include an ordinary leaf 38 and an angular leaf portion 39, to permit of the relative positions of Figures 1 and 2. Extension 35, when down, rests on bar 40.

Upon moving the bars under the rear seat forwardly, and releasing latches 22, 23, the back 20 is dropped to horizontal position and engages these bars. The forward seat portion is raised, the extension 35 moved outwardly, and the seat portion moved rearwardly to the position of Figure 2. The operation is simple, there are no detached portions liable to loss or displacement, and the change can be effected almost instantly.

What we claim is:

The combination with the rear seat of a vehicle, and elements movable forwardly therefrom, of a front seat including a hingedly mounted back and a rearwardly slidable horizontal seat portion, a supporting member to which the back is hinged, a transverse member hinged to the supporting member, on a level therewith and in the plane of the hinged back when horizontal, and cooperating with said hinged back to support the front seat when the latter is moved rearwardly, an extension hinged to the transverse member, and movable beneath the latter and outwardly therefrom to position on a level with the slidable horizontal portion of the front seat, and a transverse element supporting the central portion of the extension when the latter has been moved outwardly.

In testimony whereof we affix our signatures.

HENRY CLAY LIPSCOMB.
    CLAYO POWERS LIPSCOMB.